C. E. DULIN.
Pipe-Couplings.
No. 158,259. Patented Dec. 29, 1874.
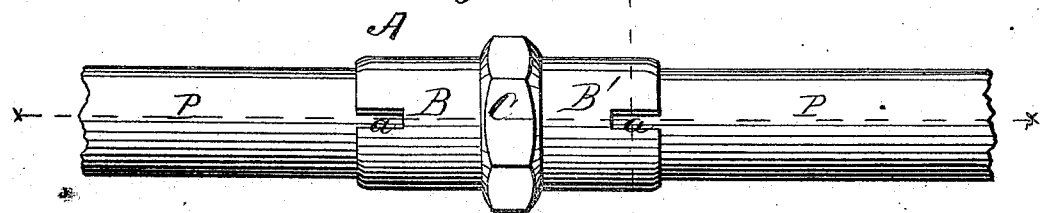
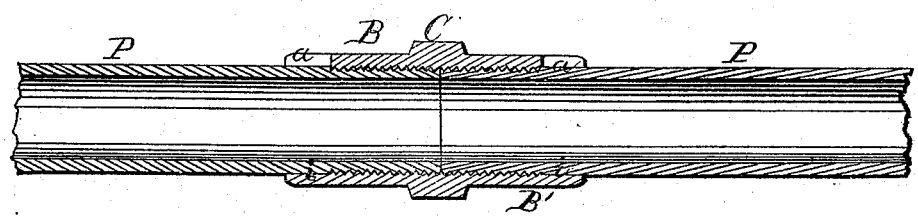
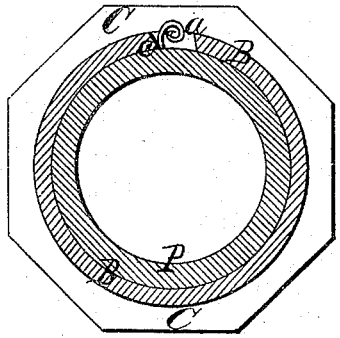
WITNESSES
Robert Everett
F. J. Masi
INVENTOR
Charles E. Dulin
Chipman and Hosmer & Co.
ATTORNEYS

UNITED STATES PATENT OFFICE.

CHARLES EDWIN DULIN, OF PHILADELPHIA, PENNSYLVANIA.

IMPROVEMENT IN PIPE-COUPLINGS.

Specification forming part of Letters Patent No. 158,259, dated December 29, 1874; application filed November 28, 1874.

*To all whom it may concern:*

Be it known that I, CHARLES E. DULIN, of Philadelphia, in the county of Philadelphia and State of Pennsylvania, have invented a new and valuable Improvement in Pipe-Couplings; and I do hereby declare that the following is a full, clear, and exact description of the construction and operation of the same, reference being had to the annexed drawings, making a part of this specification, and to the letters and figures of reference marked thereon.

Figure 1 of the drawing is a representation of a side view of my pipe-coupling. Fig. 2 is a longitudinal central sectional view of the same; and Fig. 3 is a transverse sectional view.

This invention has relation to couplings for lead and other soft-metal pipes.

The object of the invention is to produce a means whereby the ends of the pipes to be coupled will be screw-threaded in the act of being inserted into the ends of the coupling, thus rigidly connecting them together, and at the same time forming air-tight joints.

To this end the nature of the invention consists in a notch cut longitudinally in the edges of a tubular coupling having right and left screw-threaded ends, whereby the inner edges of the said thread are inwardly burred up, affording cutting-edges, whereby the ends of the said pipes are provided with corresponding male threads when they are inserted into the said coupling, the cuttings thereby made escaping through the notch, as will be hereinafter more fully explained.

In the annexed drawings, A designates my improved coupling, consisting of two female screw-threaded sleeves, B B', connected by a prismatic portion, C, the said thread being in one cut to the right, and in the other to the left. *a* designates a notch cut longitudinally in the edge of the sleeves B B', either by filing or by bringing the said edge in contact with a suitable saw. By this means the interior of the notch is slightly burred up inwardly, affording a cutting-edge, *c*, for a purpose hereinafter explained.

After the sleeves B B' are provided with their right and left screw-threads, their front inner surfaces are turned off by a suitable tool, forming a smooth annular space, *i*, of greater diameter than the rest of the interior of the sleeves, which serves as a guide, whereby the pipe may be accurately directed in the same plane with the longitudinal axis of the sleeve, inward within reach of the screw-threads.

The two pipes having been inserted into the sleeves of the coupling, I secure them thereto by turning one to the right and the other to the left, when they will be immediately seized by their screw-threads and drawn inward toward each other. During their inward progress, the burr *c*, formed when the notches *a* were cut, will automatically cut the male thread upon the said pipes, which, becoming engaged with the female threads in the rear of the said cutting-edge, will, if the pipes be still turned, finally bring the ends of the pipes P in rigid contact, as shown in Fig. 2, the said cutting-edge forming the male threads during the whole time of the inward progress of the pipes, so that they may now be taken out by unscrewing, and reapplied when necessary.

By means of the notches *a*, not only is a cutting-edge, *c*, formed, but a means is afforded whereby the cuttings may escape from the sleeves, as shown in Fig. 3, thereby greatly adding to the facility with which the threads are made, and also effectually preventing clogging.

In practice I propose to make the female threads of the sleeves B B' slightly tapering, but do not propose to confine myself to that construction.

It will be seen from the above description that the male thread on the ends of the pipes to be coupled are accurately cut thereon by the cutting-edge *c* during the inward progress of the said pipes; also, that the cuttings, being allowed to escape through the notches *a*, will not clog and render the act of inserting the pipes unduly laborious.

It will also be seen that my improved coupling, being also a thread-cutter, may be used in the shop to form the said threads on the pipes, which may then be uncoupled, conveniently carried to any desired locality, and there expeditiously and readily set up.

What I claim as new, and desire to secure by Letters Patent, is—

In a coupling for soft-metal pipes, the notches $a$, cut into the edges of the sleeves B B', thereby forming a cutting-edge, $c$, substantially as specified.

In testimony that I claim the above I have hereunto subscribed my name in the presence of two witnesses.

CHAS. E. DULIN.

Witnesses:
   H. DIENELT,
   GEORGE F. EISENHARDT.